(12) United States Patent
Warble (10) Patent No.: US 11,493,136 B1
(45) Date of Patent: Nov. 8, 2022

(54) DISCRETE STEP, MAXIMUM FLOW-RATE-SELECTABLE VALVE

(71) Applicant: Garry Warble, Fallston, MD (US)

(72) Inventor: Garry Warble, Fallston, MD (US)

(73) Assignee: conservalve, LLC, Fallston, MD (US)

( * ) Notice: Subject to any disclaimer, the term of this patent is extended or adjusted under 35 U.S.C. 154(b) by 0 days.

(21) Appl. No.: 17/735,281

(22) Filed: May 3, 2022

Related U.S. Application Data

(60) Provisional application No. 63/271,477, filed on Oct. 25, 2021.

(51) Int. Cl.
*F16K 3/02* (2006.01)
*F16K 3/04* (2006.01)
*F16L 29/00* (2006.01)

(52) U.S. Cl.
CPC .............. *F16K 3/0209* (2013.01); *F16K 3/04* (2013.01); *F16L 29/007* (2013.01)

(58) Field of Classification Search
CPC . F16K 3/0209; F16K 3/04; F16K 3/34; F16K 5/12; F16K 3/32; F16L 29/007; F16L 29/00; F16L 55/027; F16L 55/02718; F15B 21/003
USPC .......................................... 251/206, 205, 345
See application file for complete search history.

(56) References Cited

U.S. PATENT DOCUMENTS

| | | | | |
|---|---|---|---|---|
| 2,132,333 A | * | 10/1938 | Sargent | B05B 1/1654 239/394 |
| 2,790,680 A | * | 4/1957 | Gordont | B05B 1/1654 239/487 |
| 4,148,460 A | * | 4/1979 | Kinsler | F16K 3/32 251/185 |
| 4,582,084 A | * | 4/1986 | Gyurovits | F16K 5/10 137/493.8 |
| 4,848,403 A | * | 7/1989 | Pilolla | F16K 3/085 251/304 |
| 4,909,476 A | * | 3/1990 | Messick | G01F 1/42 251/205 |
| 5,016,673 A | * | 5/1991 | Carter | F16K 3/32 138/45 |
| 6,053,056 A | * | 4/2000 | Zaiser | F16K 3/34 73/861.61 |
| 6,164,620 A | * | 12/2000 | Shiba | F16K 27/003 251/121 |
| 6,302,339 B1 | | 10/2001 | Chou | |

(Continued)

*Primary Examiner* — Mary E McManmon
*Assistant Examiner* — Andrew J Rost
(74) *Attorney, Agent, or Firm* — Larry J. Guffey; Oliver & Grimsley, LLC (57) ABSTRACT

A discrete step, maximum flow-rate-selectable valve includes: (a) an entry tube with: (i) an exit with a single, off-center hole that lies on the circumference of a circle of radius "r" that is centered on the centerpoint of the exit, and (ii) an exterior surface having a portion with rotational symmetry, (b) a selector tube with: (i) an exit with a plurality of holes, each having a differing diameter and a center point that lies on the circumference of a circle of radius "r" which is centered on the centerpoint of the selector tube exit, and (ii) an interior surface configured to lie proximate said entry tube, exterior surface portion having rotational symmetry so as to assist in providing a water-tight seal between said tubes, and (c) a means to enable the selector tube to rotate in discrete steps around the entry tube.

20 Claims, 7 Drawing Sheets

(56) References Cited

U.S. PATENT DOCUMENTS

| | | | |
|---|---|---|---|
| 6,510,747 B1 * | 1/2003 | Zaiser | F16K 3/34 |
| | | | 73/861.61 |
| 6,681,418 B1 | 1/2004 | Bierend et al. | |
| 6,695,281 B2 | 2/2004 | Williams, Jr. | |
| 7,124,999 B1 | 10/2006 | Lai | |
| 7,172,173 B1 | 2/2007 | Lai | |
| 9,689,520 B2 * | 6/2017 | Taneya | F15B 21/003 |
| 10,744,522 B2 * | 8/2020 | Wu | F16K 27/045 |
| 2010/0122742 A1 * | 5/2010 | Lin | B01D 61/10 |
| | | | 137/497 |
| 2013/0138075 A1 * | 5/2013 | Lambert | A61M 39/10 |
| | | | 604/500 |

* cited by examiner

DISCRETE STEP, MAXIMUM FLOW-RATE-SELECTABLE VALVE

CROSS-REFERENCE TO RELATED APPLICATION

This Applications claims the benefit of Provisional Patent Application No. PPA 63/271,477, filed Oct. 25, 2021 by the present inventor. The teachings of this application are incorporated herein by reference to the extent that they do not conflict with the teaching herein.

BACKGROUND OF THE INVENTION

1. Field of the Invention

This invention relates to improvements in water conservation. More particularly, the present invention is an in-line, selectable flow control valve or restrictor with discrete, flow steps to reduce water to, for example, a sink faucet or any other fixture (e.g., showerhead or other type of on/off flow valve) when it is desired that the faucet's flow rate not exceed a possibly temporarily varying, maximum value (e.g., as might be imposed by a governmental entity at 2.2 gpm @ 60 psi and then subsequently lowered to 1.8 gpm @ 60 psi in order to further reduce water consumption).

2. Description of the Related Art

For water conservation reasons, faucets are usually designed to deliver only a certain maximum desired flow rate at a standard line water pressure, and there is ongoing pressure to continue to reduce such maximum flow rates. One way to do this without possibly upsetting faucet users, who usually prefer the feel of higher flow rates, is for faucet manufactures to maintain the feel of a high flow rate faucet by installing an aerator in them. Aerators introduce air into water streams in order to help such streams provide the same tactile sensations for their users as those of higher flow rate, un-aerated water streams. However, such aerators are not adjustable and therefore cannot be used to provide for still further reductions in water flow rates.

The desired to further reduce the maximum flow rate for existing faucets (e.g., to meet or exceed water-saving targets for green buildings) will often create a dilemma for the one responsible for the operation of such faucets. Do they have to replace all of their current faucets? Can they adjust the typical, upstream-of-the-faucet, shutoff-off valves in such a manner so as to bring their faucets into compliance with desired, lower, maximum flow rate requirements?

Figure 1:
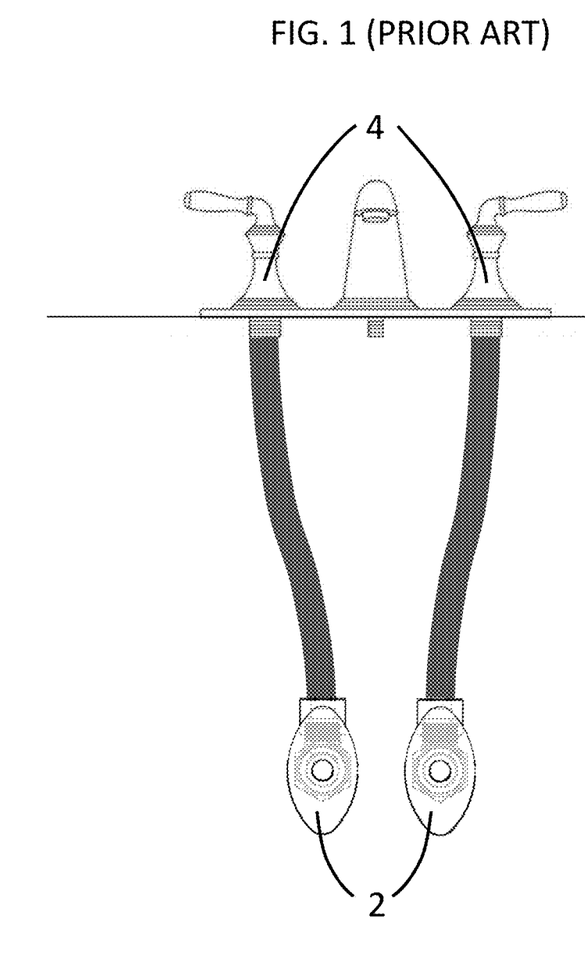
FIG. 1 is a perspective view of a typical faucet and its upstream shut-off valves.

Typical, water shut-off valves 2 for sink faucets 4, see FIG. 1, are usually intended to be used in either their completely opened or closed positions. While they can conceivably offer some form of flow regulation; doing such would be extremely difficult because any ideal valve setting would be very hard to duplicate from one valve to another. Additionally, setting a shut-off valve to a position other than fully open or closed can cause a build-up of deposits such as calcium to form and inhibit adjustment of the valve in the future.

There have been prior attempts to regulate the flow to or through shut-off valves and thereby control or reduce flow through a faucet. These include: U.S. Pat. Nos. 7,124,999 and 7,172,173 issued to Hung-Lin Lai and disclosing a valve with a flow limiting pin that allows for limited adjustment of flow through the valve. U.S. Pat. No. 6,695,281 to Edward Williams Jr. discloses a device that includes a motion sensor that stops the flow when a person is not sensed near the faucet. U.S. Pat. No. 6,681,418 to Gary D. Bierend et al., discloses a water flow control device that is operated as a pressure regulator with a spring located within the valve which allows for nearly an open flow of fluid through the valve when the difference in pressure on both sides of the valve is significantly different. U.S. Pat. No. 6,302,339 to Hsiao-Tsung Chou discloses a device in which the flow adjustment is made by turning the spray head of the faucet. When the spray head is turned the flow is reduced.

While such devices allow for some water saving through a faucet, they do not provide finite, maximum, flow-rate steps that can be imposed to yield further water conservation. What is needed is a flow valve that can be retrofit with existing shut-off valves and into the existing, stationary plumbing lines that connect to the faucet (see FIG. 1), or installed new on a faucet's plumbing lines to provide a means which yields finite steps for regulating faucet water flow rates and consequently yields enhanced water conservation. The present invention seeks to provide such a discrete step, maximum flow rate selectable valve.

DESCRIPTION OF THE PREFERRED EMBODIMENT

Recognizing the need for a device or means which yields finite steps for regulating faucet water flow rates and consequently enhanced water conservation, the present invention seeks to provide such a device.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 2:
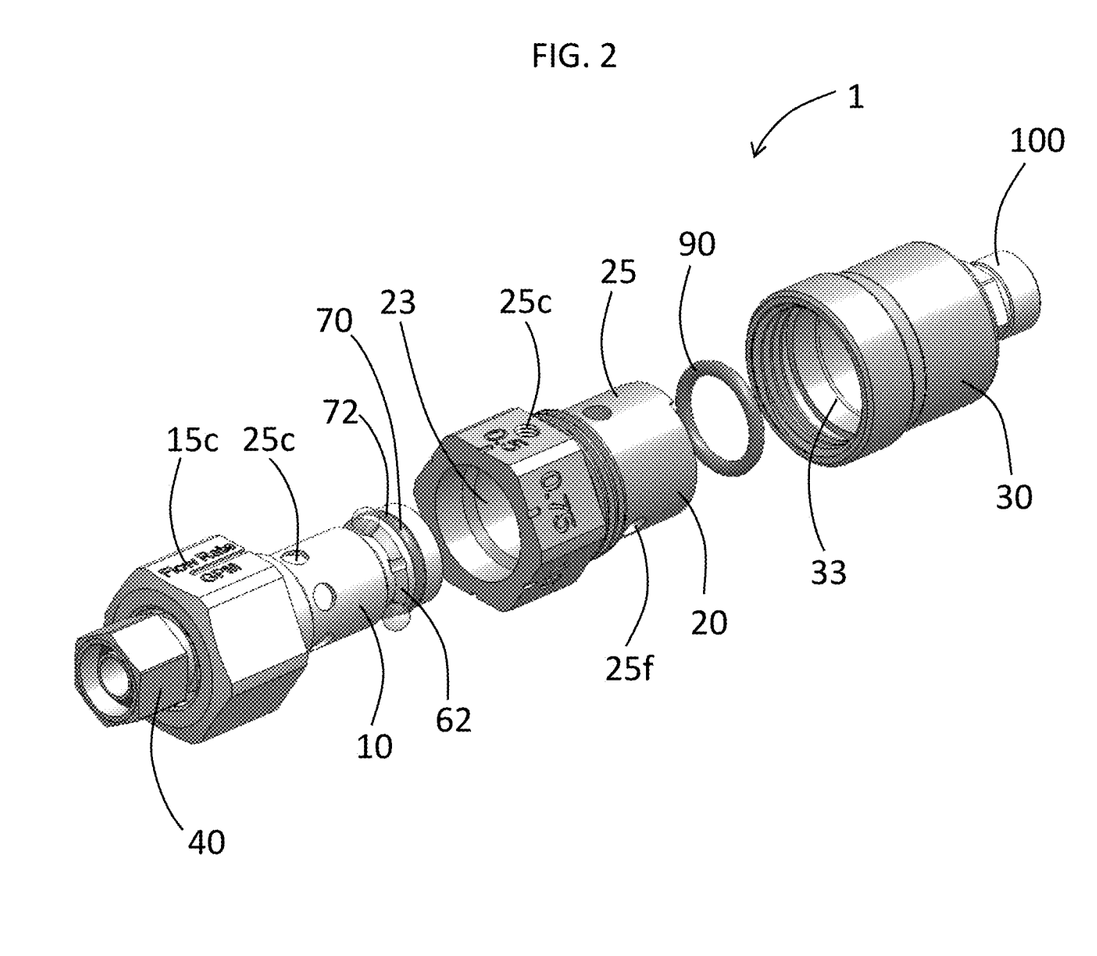
FIG. 2 is an exploded, perspective view of a preferred embodiment of the present invention in which the viewer is looking from the entry end of the invention.

FIG. 2 is an exploded, perspective view of a preferred embodiment of the present invention in which the viewer is looking from the entry end of the invention. It is a discrete step, maximum flow-rate-selectable valve. It enables one to easily meet and adjust to changes in imposed, flow rate restrictions, regardless of the design of the downstream faucet.

It is seen to consist of the following principal elements, an entry tube 10, a selector tube 20, a bell cap 30, an input plumbing fitting 40, a set screw 50 or a means for temporarily locking the entry and selector tubes together, ball bearings 60 or a means for assisting in rotating the selector tube about the entry tube's centerline, and various O-rings: #1 70, #2 80 and #3 90 or means for preventing water leakage, and an exit plumbing fitting 100. See also the similar view (but from the invention's exit end) in FIG. 3.

Figure 3:
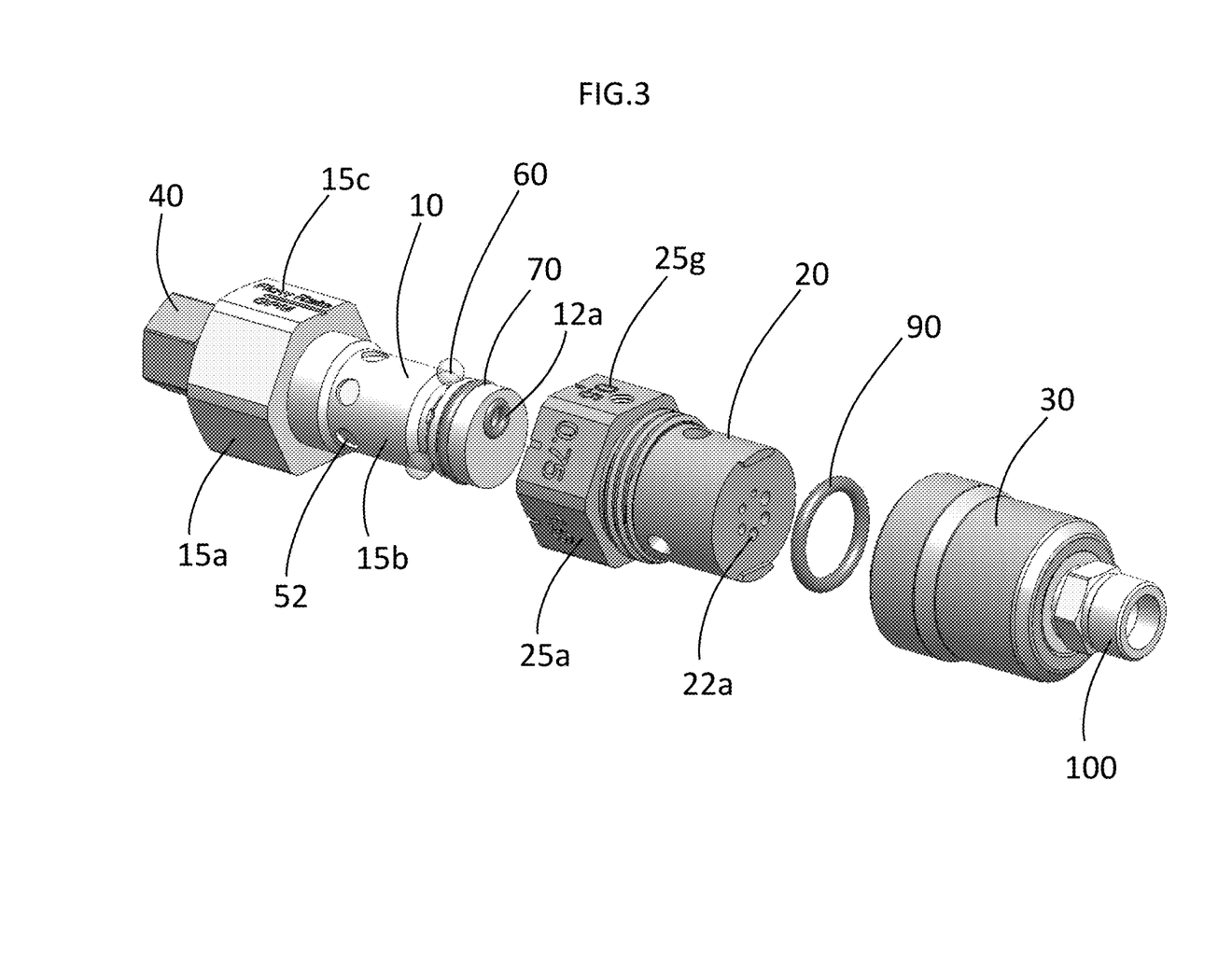
FIG. 3 is similar to FIG. 2 in that is an exploded, perspective view of a preferred embodiment of the present invention, but in this situation the viewer is looking from the exit end of the invention.

It can be seen in FIG. 3 that the entry tube's exit 12 has a single, off-center hole 12a whose center is located at a radial distance "r" from the entry tube's centerline 16. See also FIG. 5. Meanwhile, the selector tube's exit 22 is seen to have a plurality of different diameter holes (six are shown in FIG. 3) that are spread around and located on a circle having this same radius "r" and whose centerpoint lies on the selector tube's centerline 26. See also FIG. 6.

The invention's ball bearings 60 and configuring the first portion or section 25a of the selector tube's exterior surface 25 in the shape of a polygon (shown as a hexagon in FIG. 3, and thereby providing a means for further assisting in rotating the selector tube about its entry tube) allows a circumferential force to be applied to the first section of selector tube's exterior surface so as to easily rotate it with respect to the invention's stationary entry tube 10 in order to align one of the selector tube's different diameter holes 22a with the entry tube's single hole 12a. The selector tube's holes 22a have differing diameters allow each of them to impose, at a constant line pressure, a different maximum flow rate on the water flowing through the present invention 1.

The selector tune's set screw 50 allows the entry and selector tubes to be locked together at a desired selector tube rotation, and consequently a desired maximum flow rate, to temporarily lock in this flow rate and prevent one from accidentally or intentionally changing the present invention's set maximum flow rate. Indicia 25f on the first section 25a of the selector tube's exterior surface 25 identifies the magnitude of this imposed, maximum flow rate. If it is desired to prevent unauthorized adjustment of the present invention's maximum flow rate setting, the top of its set screw can be configured into a specialized shape so that only a specialized tool (which would be kept in the possession only of those authorized to change the valve's setting) can be used to turn this set screw.

Figure 4:
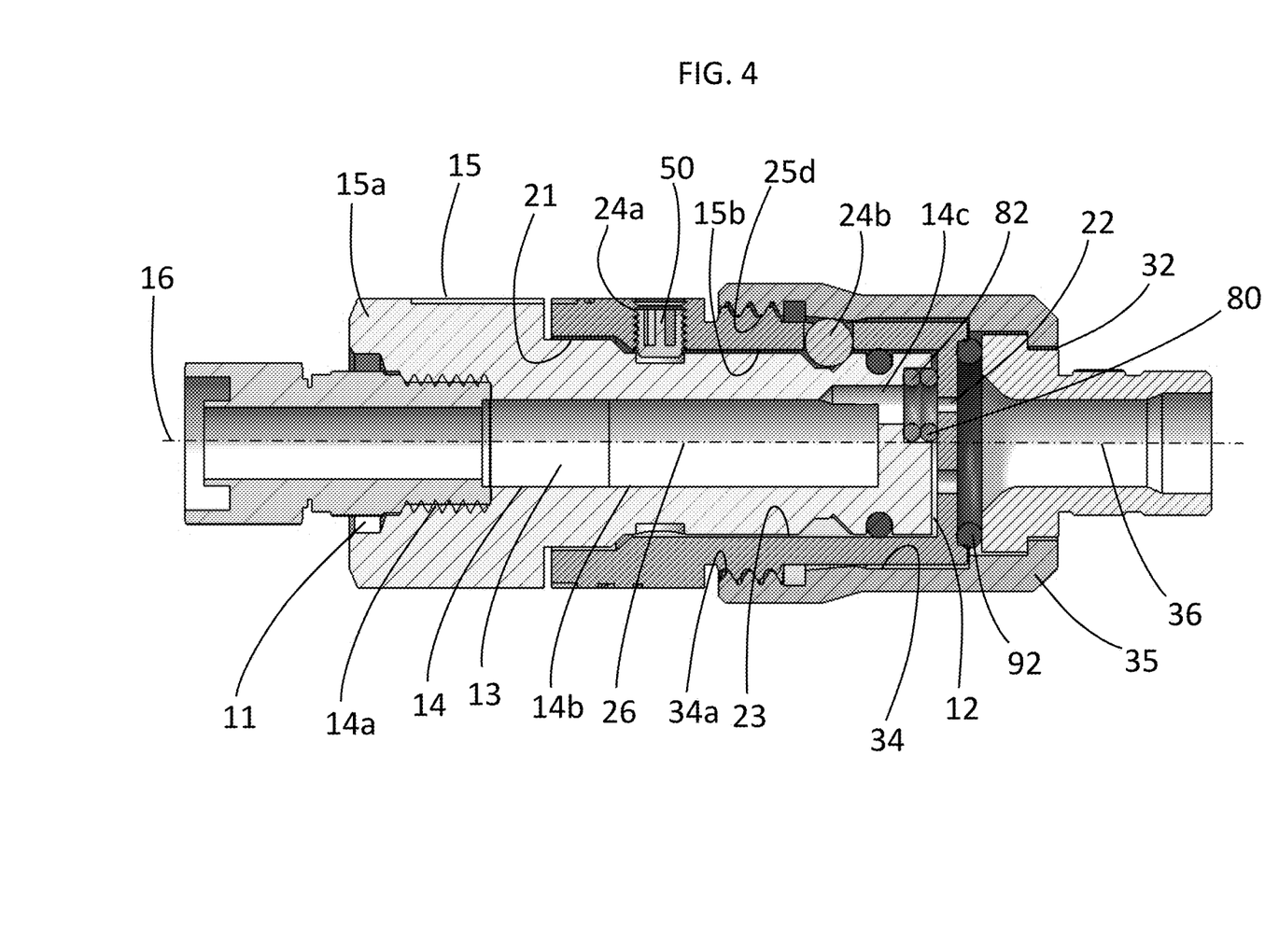
FIG. 4 is a cross-sectional view of a preferred embodiment of the present invention, and in which all of its parts have been assembled.

FIG. 4 shows a cross-sectional view of a preferred embodiment of the present invention in which all of its various parts have been assembled. The entry tube 10 is seen to have an entry tube entrance 11, an entry tube exit 12, an entry tube bore 13, entry tube interior 14 and exterior 15 surfaces, and an entry tube centerline 16.

The entry tube's interior 14 surface is seen to have an entry section 14a, a middle section 14b and an exit section 14c. Its entry section 14a is configured to accommodate an input fitting 40 that allows for an easy connection with the upstream piping, and its bore is located and aligned with the entry tube's centerline 16. As shown in this configuration, this input fitting is a female fitting. It's middle section 14b is configured to have its bore mostly aligned with the entry tube's centerline 16, except at its downstream end where this bore is configured to go off the entry tube's centerline 16 to accommodate the previously mentioned, entry tube's exit, single, off-center hole 12a. The exit section 14c of entry tube interior surface 14 consists of this off-center bore that is just upstream of the entry tube's exit's single, off-center hole 12a. It additionally has one or more circumferential groves 82 that accommodate the invention's O-rings #2 80 that are configured to prevent water leakage around this joint between the invention's entry 10 and selector 20 tube exits.

The entry tube's exterior surface 15 is seen to have a first 15a and a second 15b section. See FIG. 5. This first section 15a is again seen to be configured in the shape of a polygon so that it can be used to resist the circumferential force that is applied to the selector tube's exterior surface to rotate it with respect to the invention's entry tube 10. It also has indicia 15c that is used to help align the invention's flow-restricting holes (12a and one of the calibrated holes 22a) in response to a selector tube rotation.

Figure 5:
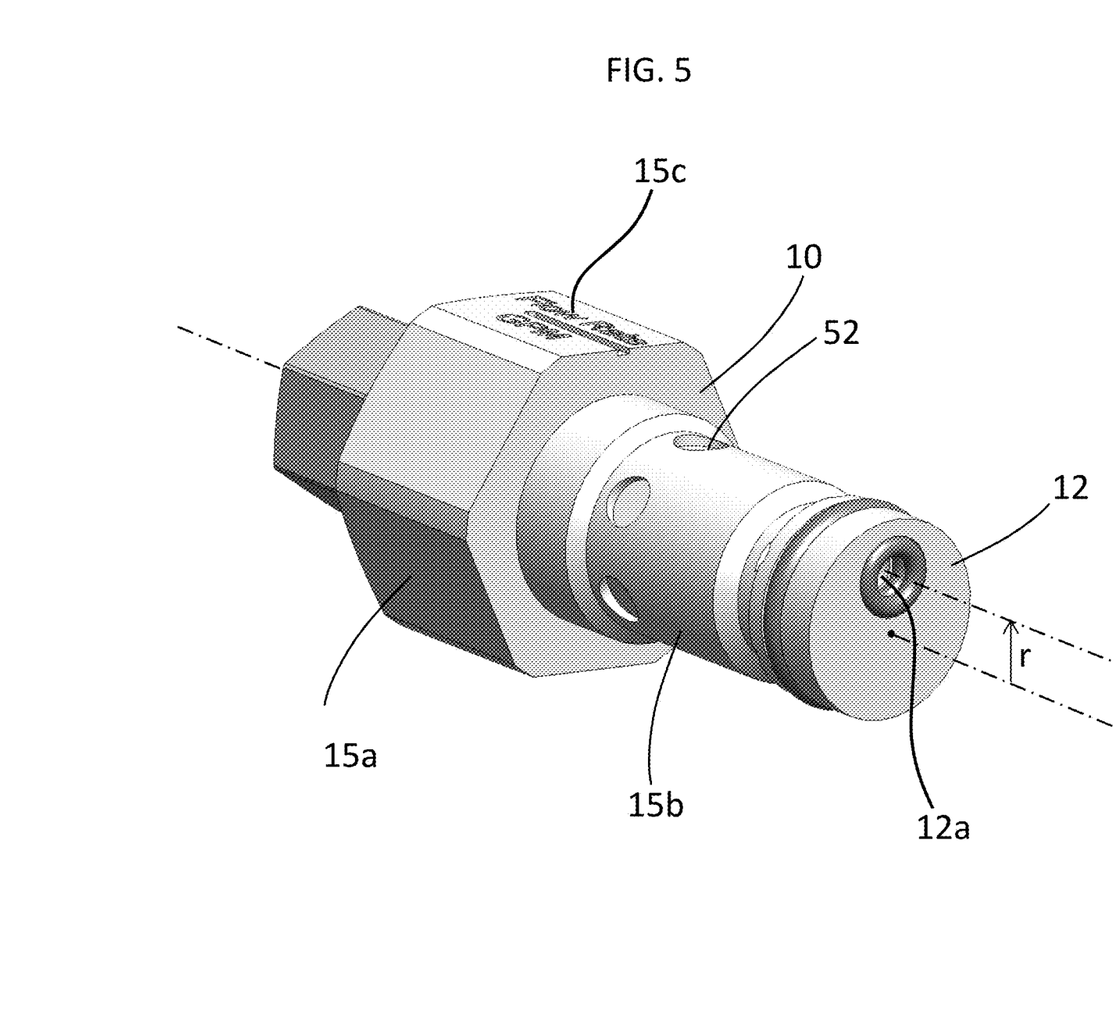
FIG. 5 is a perspective view of a preferred embodiment for the entry tube of the present invention, and in which the viewer is looking from the exit end of the entry tube.

The entry tube, exterior surface's second 15b section is seen to have located around its circumference a set of threated orifices or wells 52, one corresponding to each of the sides of the pologon-shaped first section 15a, for receiving the previously mentioned, set screw 50 that allows the entry and selector tubes to be locked together at a desired selector tube rotation. Further downstream, this section has a circumferential ball bearing groove & detents 62 that are used to seat the previously mentioned ball bearings 60 that allow the invention's selector tube to rotate. Still further downstream, there is a circumferential, O-ring #1 groove 72 that is configured to accommodate the invention's O-ring #1 70 which also helps to prevent water leakage between the invention's entry 10 and selector 20 tubes.

In FIG. 4, the selector tube of the present invention is seen to have a selector tube entrance 21, a selector tube exit 22, a selector tube bore 23, a selector tube interior surface 24, a selector tube exterior surface 25 and a selector tube centerline 26. The selector tube has a specified length between its entrance and exit and this length is set so as to enable the entry tube exit to be proximate the selector tube exit to assist in providing a water-tight seal between the exits of these tubes.

The selector tube's interior 24 surface is seen to be configured to allow it to be proximate to the entry tube's exterior surface 15 so that a water-tight seal can be provided between these surfaces. This interior surface 24 also has features that include: a threated, set screw orifice 24a that allows the invention's set screw to pass through the invention's selector tube and contact one of the underlying, circumferentially located, set of threated orifices or wells 52 that are for receiving and locking the previously mentioned, set screw 50, a set of circumferentially located, ball bearing holes 24b that are used to seat in the selector tube, the previously mentioned ball bearings 60.

The selector tube's exterior surface 25 has a first 25a and a second portion 25b. This first portion is seen to include the top of a set screw orifice 25c, a threaded section 25d that is configured to allow the invention's bell cap 30 to be attached to its selector tube 20, and the tops of the previously mentioned holes 25f that accommodate the invention's ball bearings 60. The second portion 25b of the selector tube's exterior surface is seen to have rotational symmetry.

Figure 6:
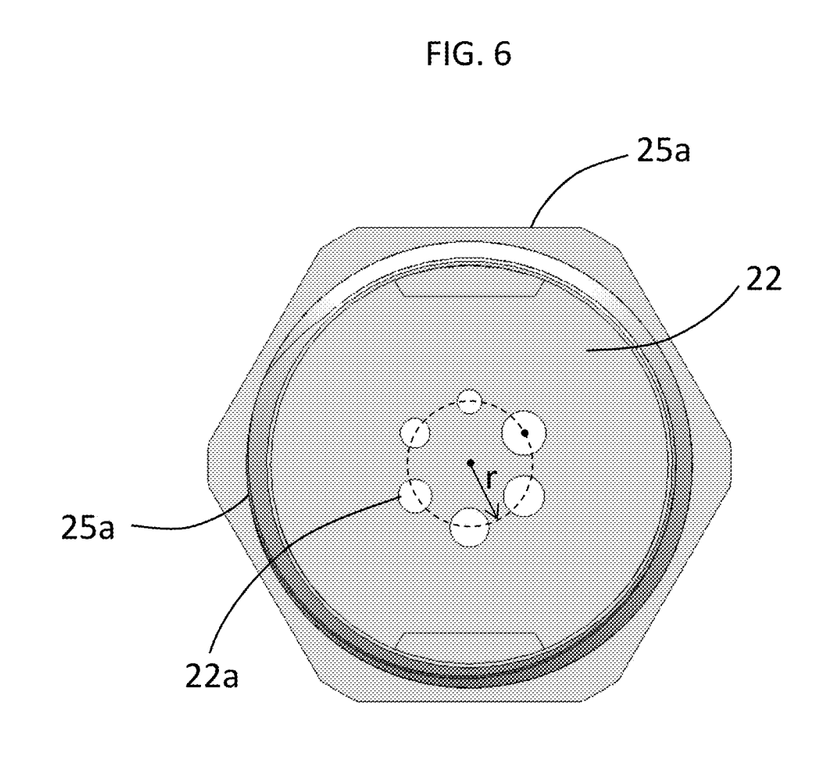
FIG. 6 is an exit end view of a preferred embodiment for the selector tube of the present invention.

The exterior surface of the selector tube's exit is shown in FIG. 6 and is seen to include the previously mentioned, plurality of different diameter, calibrated holes 22a that are spread around and located on a circle having a radius "r" and whose centerpoint lies on the selector tube's centerline 26. This selector tube, exterior surface is also seen to have a circumferential groove 92 that is used to accommodate the invention's O-ring #3 90.

It is also shown in FIG. 4 that the bell cap 30 of the present invention has a bell cap entrance 31, a bell cap exit 32, a bell cap bore 33, a bell cap interior surface 34, a bell cap exterior surface 35, and a bell cap centerline 36. The bell cap's interior 34 surface is also seen to be configured to allow it to be proximate to the selector tube's exterior surface 25 so that a water-tight seal can be provided between these surfaces. The bell cap's interior surface 34 also has features that include: a threaded section 34a that is configured to allow the invention's bell cap 30 to be attached to the selector tube 20. The portion of this interior surface 34 proximate its bell cap exit 32 is seen to be configured to allow for and connect with an exit fitting 100, configured to allow for the coupling of the present invention into the downstream end of the plumbing line into which it is to be installed.

Figure 7:
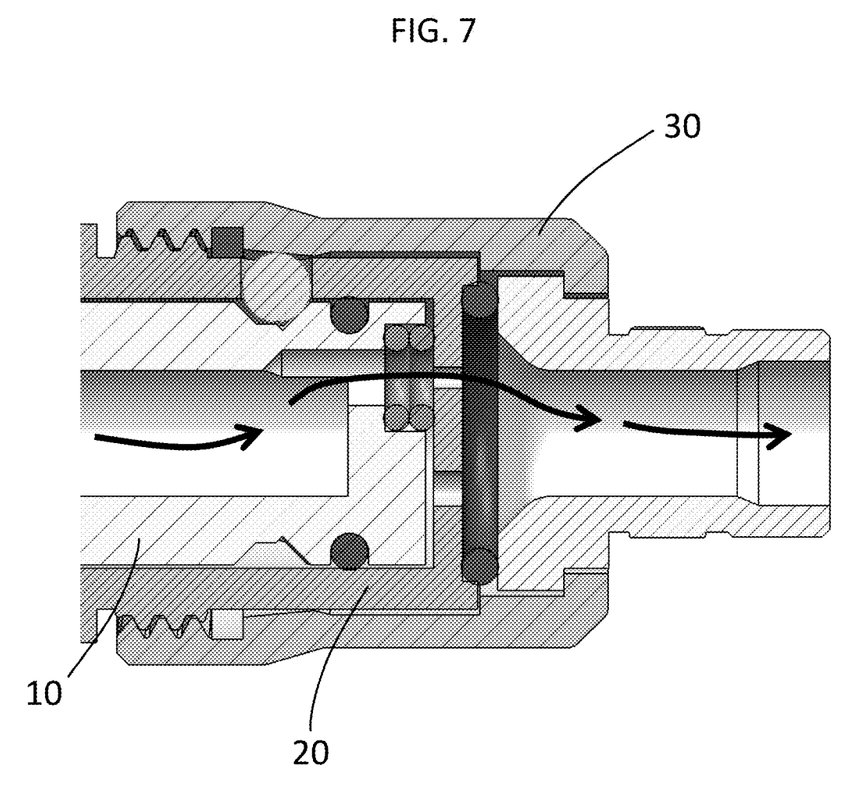
FIG. 7 is a cross-sectional view of the exit end of the selector tube with its enclosing bell cap and where an exit tube fitting is being used with the bell cap; this FIG. also has flow lines which illustrate the path of the water through one of the calibrated holes of the invention.

Finally, FIG. 7 is included to illustrate the path of the water through a selected one of the calibrated holes that serve to set a selected, maximum flow rate through the present invention.

The discrete step, maximum flow-rate-selectable valve of the present invention has many advantages over other, alternative means for adjusting to desired, new lower flow rate targets. For example, it can, with a simple rotation of its selector tube, meet a faucet's lower, targeted maximum flow rates. If the owner should, at a later time, wish to achieve additional water savings, the valve can again be adjusted at any time with minimum effort and zero disruption to existing water service (e.g., without altering the faucet, the existing supply lines or stop valve).

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted which fall within the scope of the invention that is hereinafter set forth in the claims to the invention.

I claim:

1. A discrete step, maximum flow-rate-selectable valve for use in an existing, stationary plumbing line, said valve comprising:
   an entry tube having an entry tube entrance, an entry tube exit, a bore, and an entry tube interior surface and an entry tube exterior surface,
   a selector tube having a selector tube entrance, a selector tube exit and with a specified length between said selector tube entrance and said selector tube exit, a selector tube bore, a selector tube interior surface, a selector tube exterior surface, and a selector tube centerline,
   wherein said entry tube exit having therethrough a single, off-center hole that lies on the circumference of a circle of radius "r" which is centered on the centerpoint of said entry tube exit,
   wherein said selector tube exit having therethrough a plurality of holes, with each having a differing diameter and a center point that lies on the circumference of a circle of radius "r" which is centered on the centerpoint of said selector tube exit,
   wherein said entry tube exterior surface having a first and a second portion, and said second portion having rotational symmetry,
   wherein said selector tube interior surface configured to lie proximate said second portion of said entry tube exterior surface,
   a plurality of ball bearings located between said entry tube exterior surface and said selector tube interior surface and configured for enabling said selector tube to rotate about said selector tube centerline in a plurality of discrete rotational steps around said second portion of said entry tube exterior surface, and wherein each of said discrete rotational steps are configured to bring one of said plurality of selector tube holes into alignment with said entry tube, off-center hole at the completion of each of said discrete rotational steps,
   wherein said selector tube specified length is chosen to enable said entry tube exit to be proximate said selector tube exit to assist in providing a water-tight seal between said entry tube exit and said selector tube exit,
   a bell cap having a bell cap entrance, a bell cap exit, and with a specified bell cap length between said bell cap entrance and said bell cap exit, a bell cap bore, and a bell cap interior surface, and
   wherein said specified bell cap length is chosen so as to enable said bell cap exit to extend further downstream than said selector tube exit to enable said bell cap interior surface to connect to said existing, stationary plumbing line.

2. The valve as recited in claim 1, wherein:
   said selector tube exterior surface having a first selector tube portion and a second selector tube portion, and said second selector tube portion having rotational symmetry and threads, and
   said bell cap interior surface proximate said bell cap entrance having rotational symmetry and threads that are configured to enable said bell cap to be screwed onto said threads of said selector tube, exterior surface to hold said exit fitting proximate said selector tube exit to assist in providing a water-tight seal between said selector tube exit and said exit fitting.

3. The valve as recited in claim 2, further comprising:
   an input fitting configured to enable connection of said valve to said existing, stationary plumbing line,
   wherein said entry tube interior surface proximate said entry tube entrance configured to hold said input fitting proximate said entry tube entrance to assist in providing a water-tight seal between said entry tube entrance and said input fitting, and
   an exit fitting configured to enable connection of said bell cap to said existing, stationary plumbing line.

4. The valve as recited in claim 3, further comprising:
   a means for preventing water leakage that is located between said second portion of said entry tube exterior surface and said selector tube interior surface.

5. The valve as recited in claim 4, further comprising:
   a means for preventing water leakage that is located proximate said alignment of said entry tube, off-center hole and said one of said selector tube plurality holes that is currently selected to be in alignment with said entry tube, off-center hole.

6. The valve as recited in claim 5, further comprising:
   a means for preventing water leakage that is located between said selector tube exit and said exit fitting.

7. The valve as recited in claim 6, further comprising:
   a means for temporarily locking said entry tube and said selector tubes together after said selector tube has been rotated in one of said plurality of discrete rotational steps.

8. The valve as recited in claim 7, further comprising:
   a means for assisting in rotating said selector tube, in said plurality of discrete rotational steps about said entry tube, that is located on said first portion of said selector tube exterior surface.

9. The valve as recited in claim 8, further comprising:
an indicia, configured for assisting in identifying a flow rate setting for said valve, that is located on said first portion of said selector tube exterior surface.

10. The valve as recited in claim 2, further comprising:
a means for preventing water leakage that is located between said second portion of said entry tube exterior surface and said selector tube interior surface.

11. The valve as recited in claim 2, further comprising:
a means for preventing water leakage that is located proximate said alignment of said entry tube, off-center hole and said one of said selector tube plurality holes that is currently selected to be in alignment with said entry tube, off-center hole.

12. The valve as recited in claim 2, further comprising:
a means for preventing water leakage that is located between said selector tube exit and said exit fitting.

13. The valve as recited in claim 1, further comprising:
an input fitting configured to enable connection of said valve to said existing, stationary plumbing line,
wherein said entry tube interior surface proximate said entry tube entrance configured to hold said input fitting proximate said entry tube entrance to assist in providing a water-tight seal between said entry tube entrance and said input fitting, and
an exit fitting configured to enable connection of said bell cap to said existing, stationary plumbing line.

14. The valve as recited in claim 13, further comprising:
a means for preventing water leakage that is located between said second portion of said entry tube exterior surface and said selector tube interior surface.

15. The valve as recited in claim 13, further comprising:
a means for preventing water leakage that is located proximate said alignment of said entry tube, off-center hole and said one of said selector tube plurality holes that is currently selected to be in alignment with said entry tube, off-center hole.

16. The valve as recited in claim 1, further comprising:
a means for preventing water leakage that is located between said second portion of said entry tube exterior surface and said selector tube interior surface.

17. The valve as recited in claim 1, further comprising:
a means for preventing water leakage that is located proximate said alignment of said entry tube, off-center hole and said one of said selector tube plurality holes that is currently selected to be in alignment with said entry tube, off-center hole.

18. The valve as recited in claim 1, further comprising:
a means for temporarily locking said entry tube and said selector tubes together after said selector tube has been rotated in one of said plurality of discrete rotational steps.

19. The valve as recited in claim 1, further comprising:
a means for assisting in rotating said selector tube, in said plurality of discrete rotational steps about said entry tube, that is located on said first portion of said selector tube exterior surface.

20. The valve as recited in claim 1, further comprising:
an indicia, configured for assisting in identifying a flow rate setting for of said valve, that is located on said first portion of said selector tube exterior surface.

* * * * *